June 12, 1951
A. A. ASHTON ET AL
2,556,834
PRESELECTIVE AND ACTUATING MECHANISM
FOR SELECTIVE SPEED TRANSMISSIONS
Filed May 28, 1948
2 Sheets-Sheet 1
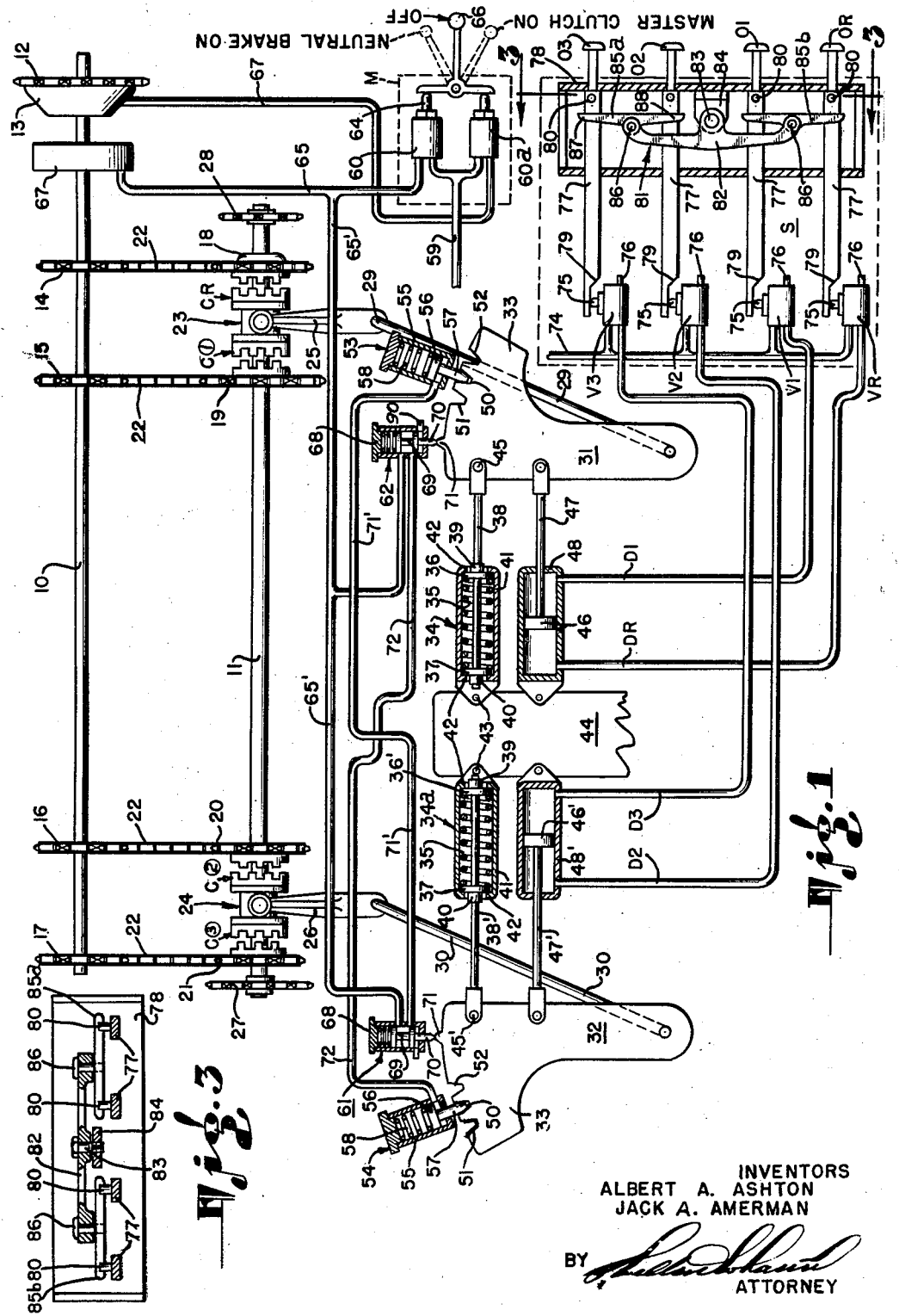
INVENTORS
ALBERT A. ASHTON
JACK A. AMERMAN
BY
ATTORNEY

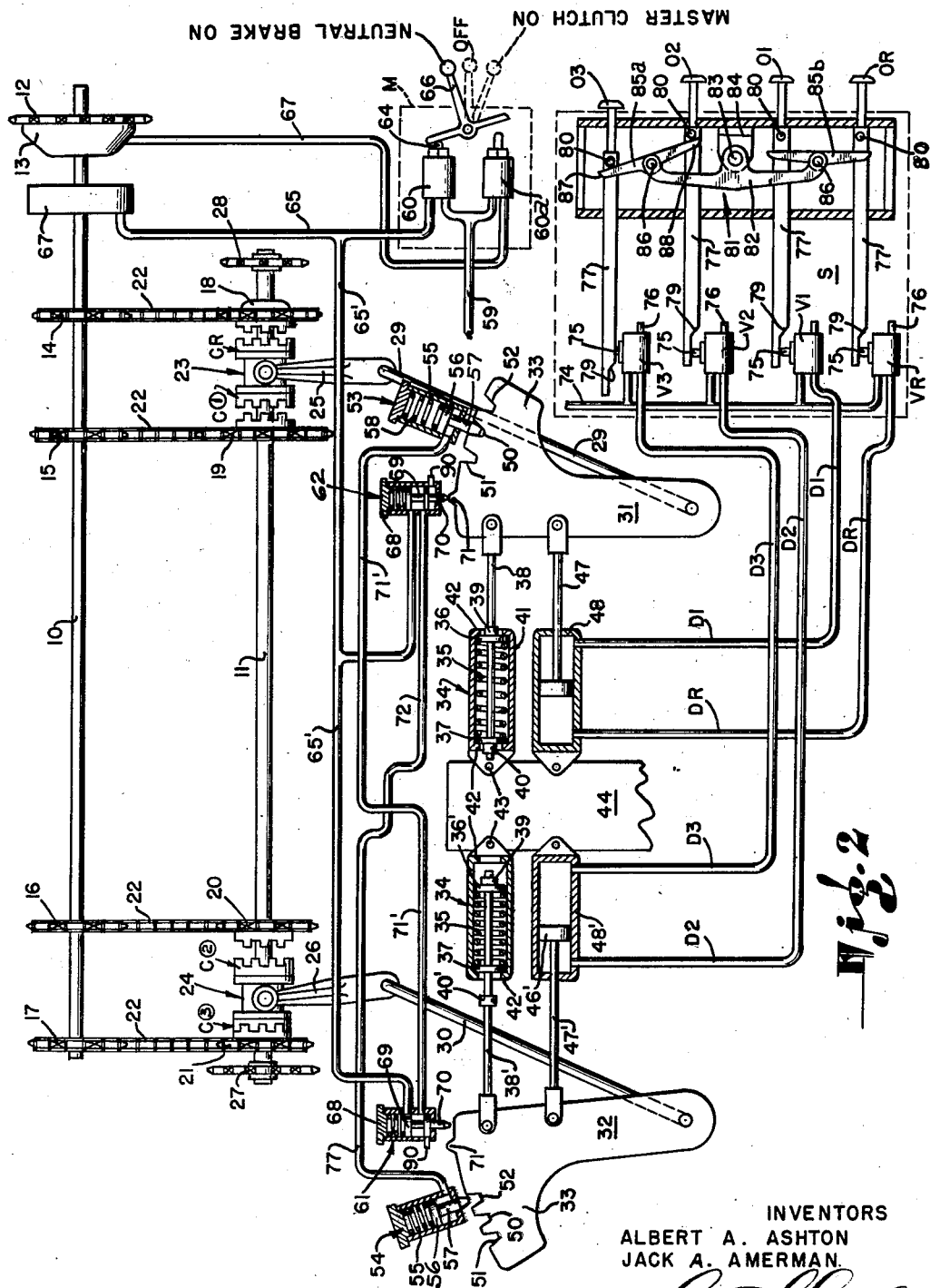

Patented June 12, 1951

2,556,834

UNITED STATES PATENT OFFICE 2,556,834

PRESELECTIVE AND ACTUATING MECHANISM FOR SELECTIVE SPEED TRANSMISSIONS

Albert A. Ashton and Jack A. Amerman, Houston, Tex., assignors to Emsco Derrick & Equipment Company, Los Angeles, Calif., a corporation of California Application May 28, 1948, Serial No. 29,904

10 Claims. (Cl. 192—4)

This invention relates to multi-speed transmissions, and relates in particular to a selective operating and control means for multi-speed transmissions which is positive in its operation and incorporates mechanism operating automatically to prevent injury to the control mechanism or to the transmission as a result of the operator's lack of care.

Although the invention is useful with transmissions for driving various types of mechanisms, it is of special utility with transmissions of heavy equipment, such as drawworks employed in oil well drilling rigs.

It is an object of the invention to provide a multi-speed transmission and a control cooperating in such a manner that when one of the clutch means of the transmission is operating to transmit power, the remaining clutches or power transmitting means cannot be engaged or put into operation.

A further object of the invention is to provide a transmission and cooperating actuating and control means wherein a fluid, such as air, for example, is employed as a medium for transmitting the control and actuating effect from a control station to the parts of the control mechanism directly associated with the transmission.

It is an object of the invention to provide for control of a plurality of power delivering or transmitting parts, control members which are mechanically associated with such parts for the actuation and control thereof, these control members having fluid motor means which may be simple piston and cylinder assemblies for moving the control members through the respective positions required thereof in their actuating and control functions, the invention also including lock means for the control members and also supervisory control means operating in conjunction therewith to prevent misuse of the equipment, thereby making it impossible for an operator to engage more than one of the ratio-drive clutches of the transmission at a time or to engage clutch parts of the ratio-drive transmissions while relative motion between the clutch parts exists.

It is a further object of the invention to provide a selective manual control for the operation of the clutch actuation mechanism having simple and positive means for preventing at any instant movement into "on" position of more than one of the manually operative speed selecting members.

It is a further object of the invention to provide a control of the character described in the preceding paragraph having fulcrumed levers which cooperate when one of the manually operative speed selecting members is moved into "on" position to hold the rest of the manually operative speed selecting members in "off" position.

Further objects and advantages of the invention may be brought out in the following part of the specification, wherein details of a preferred embodiment of the invention are included for the purpose of making a clear disclosure of the principles of the invention without limiting the scope thereof which is set forth in the appended claims.

Referring to the drawings which are for illustrative purposes only:

Fig. 1 is a partly sectioned schematic view showing a multi-speed transmission and an operating mechanism therefor in elevation, with interconnecting shafts arranged in perspective between the transmission and the operating means thereof.

Fig. 2 is a schematic view similar to Fig. 1, but showing selected parts in different positions from the positions thereof occupied in Fig. 1.

Fig. 3 is a cross sectional view of the selector limiting means, taken as indicated by the line 3—3 of Fig. 1.

In the selective speed power transmission of rotary drawworks, it is customary to employ a power shaft which is driven at engine speed and a variable speed shaft which is driven from the power shaft through chain and sprocket speed ratio drives having associated clutches, this variable speed shaft having thereon sprockets which are connected by chains with the parts of the drawworks which are to be driven at different speeds. In Fig. 1 we have shown a power shaft 10 and a variable speed shaft 11 arranged in parallel relation. It will be understood that in the present illustration, the positions of the shafts 10 and 11 have been adopted for the purpose of simplifying this disclosure, and that in the drawworks or other selective speed transmission, the parts may be otherwise arranged. For the driving of the power shaft 10 from an engine, a sprocket 12 is shown which may be connected to the shaft 10 by a fluid operated clutch 13. The shaft 10 is shown with sprockets 14, 15, 16 and 17 fixed thereon.

For the driving of the shaft 11 at different speeds, sprockets 18, 19, 20 and 21 are turnably mounted on the shaft 11 and are connected by chains 22 with the sprockets 14, 15, 16 and 17. Jaw clutches CR, C1, C2 and C3 are provided for connecting the sprockets 18 to 21 respectively to the shaft 11. The clutches include clutch bodies 23 and 24 adapted to be moved axially on the shaft 11 by clutch shifting yokes 25 and 26. When the clutch body 23 is shifted rightwardly from the position in which it is shown in Fig. 1, the reverse clutch CR will be engaged, and when the clutch body 23 is moved leftwardly from its neutral position, low speed clutch C1 will be engaged. Similarly, the rightward and leftward shifting of the clutch body 24 will respectively engage the intermediate clutch C2 and the high speed clutch C3. Therefore, by selective operation of the clutches, it is possible to drive the shaft 11 from the power shaft 10 at three different forward speeds and one reverse speed. The shaft 11 has thereon drive sprockets 27 and 28 of different size, arranged for connection by use of chains with parts or a part of the drawworks, for example, the drawworks drum, and since the sprockets 27 and 28 are disposed in chain transmissions of different speed ratios, it is possible to obtain from the transmission shown six different forward speeds and two different reverse speeds.

The clutch shifting yokes 25 and 26 are fixed on shafts 29 and 30. These shafts 29 and 30 extend horizontally and are shown in perspective so as to give the impression that the operating and control mechanism about to be described is spaced forwardly from the shaft 11. At the front ends of the shafts 29 and 30, control members 31 and 32 are fixed, these control members being shown extending upwardly from the shafts 29 and 30 and having the form of levers with arcuate portions 33 on the upper ends thereof. When the control members 31 and 32 are swung rightwardly from the neutral positions in which they are shown, corresponding movements of the clutch shifting yokes 25 and 26 will be effected and the clutches CR, C1, C2 and C3 will be engaged as previously described. For the control members 31 and 32, neutralizers 34 and 34a are provided, which neutralizers are of identical construction, but are disposed in right hand and left hand relation. Each of these neutralizers 34 and 34a comprises a compression spring 35 disposed between circular plates 36 and 37 which are slidable on a bar 38 between collars 39 and 40 which are fixed on the bar 38 in spaced relation. The spring 35, the circular plates 36 and 37 and a portion of the bar 38 are disposed within a cylindric shell 41 having lips 42 at the ends thereof to engage the outer faces of the plates 36 and 37. The shell 41 is connected by pivot means 43 to a stationary support 44, and the bar 38 is connected by pivot means 45 to the upper portion of the control member 31. The operation of the neutralizers 34 and 34a will be understood from the following description of the action of the neutralizer 34. When the control member 31 is swung in counterclockwise direction from its neutral position, the collar 39 will force the circular plate 36 leftwardly, compressing the spring 35. Leftward movement of the plate 37 will be limited by the lips 42 at the leftward end of the shell 41, but the bar 38 will slide leftwardly through the plate 37 and the collar 40 will move leftwardly from the position in which it is shown in Fig. 1. When the control member 31 is swung in clockwise direction from its neutral position shown in Fig. 1, collar 40 will move plate 37 rightwardly, compressing the spring 35. The plate 36 will be held from leftward movement by the lips 42 at the rightward end of the shell 41. When the control member 31 is released from force tending to swing the same, or tending to hold the same in shifted position, the spring 35 will act to spread the plates 36 and 37 to the fullest extent permitted by the collars 39 and 40, thereby bringing the peripheral portions of the plates 36 and 37 into close proximity to the lips 42 so that the bar 38 is then positioned so as to hold the control member 31 in a neutral position, wherein the clutch body 23 will be held in a neutral position so that the clutches CR and C1 will be both disengaged.

For swinging the control members 31 and 32 rightwardly and leftwardly from the neutral positions thereof, fluid operated motors are provided. These fluid operated motors comprise cylinder piston arrangements as shown. For moving the control member 31, a double acting piston 46 is provided, this piston 46 being connected to the member 31 by a rod 47 and is positioned, when the member 31 is in neutral position, intermediately between the ends of a cylinder 48. The piston 46 and the cylinder 48 are effective as two separate fluid operated motors. When fluid is delivered through the duct D1 to the rightward portion of the cylinder 48, the piston 46 will be moved leftwardly and when operating fluid is delivered through the duct DR to the leftward end of the cylinder 48, the piston 46 will be forced rightwardly. For moving the control member 32, a cylinder piston mechanism is provided. When operating fluid is delivered through the ducts D2 and D3 respectively to the leftward and rightward ends of the cylinder 48', the piston 46', operative therein, will be forced rightwardly or leftwardly and the force applied thereto will be transmitted through a connecting rod 47' to the control member 32. The cylinders 48 and 48' are connected to the stationary support 44.

The invention also provides holding means for maintaining the control members 31 and 32 in neutral or "off" positions and in laterally shifted or "on" positions. In the arcuate portions 33 of the control members 31 and 32, there are neutral notches 50 and left and right notches 51 and 52. Lock means 53 and 54 respectively are provided for cooperation with the control members 31 and 32, each of these lock means 53 and 54 comprising a cylinder 55, a piston 56 slidable therein, and an engager 57 of pin form connected to the piston 56 and extending out through the lower end of the cylinder 55 for engagement with notches 50, 51 and 52. In the upper portion of the cylinder 55 there is a compression spring 58 for urging the piston and its projecting pin or engager 57 downwardly, so that forcible engagement of the lower tapered end of the engager 57 with a notch 50, 51, or 52 will be maintained at times when fluid pressure is not applied within the lower portion of the cylinder 55 to the lower face of the piston 56 to raise the same. Fluid pressure for raising the pistons 56 of the lock means 53 and 54 is obtained from fluid pressure piping 59 through a valve 60 when such valve 60 is opened as will be hereinafter described, but supervisory control members 61 and 62 are provided for preventing release of the lock means 53 and 54, respectively, by delivery of fluid pressure thereto when the control members 32 and 31 are out of neutral position.

The valve 60 is a part of a master control M which is a featured part of the present invention. The valve 60 is of the pressure applying and releasing type. That is to say, when the operating stem 64 of this valve 60 is in extended position, the piping 65, which extends from the valve 60, will be connected to exhaust or atmosphere, and when the operating stem 64 is pressed inward by raising of an operating lever 66, the fluid pressure supply piping 59 will be connected to the piping 65. The piping 65 is connected to an air actuated brake 67 for stopping the shaft 10. Through branch piping 65', the delivery piping 65 is connected to the inlets of the supervisory control devices 61 and 62. For control of the master clutch 13, the master control M has a valve 60a of the same type as and disposed below the valve 60 so that when the control lever 66 is swung downward, the valve 60a will be actuated and will connect the fluid pressure supply piping 59 with delivery piping 67 which is connected with the air chamber of the master clutch 13. When the control lever 66 is in neutral or "off" position, as shown in Fig. 1, the valve 60a will connect the piping 67 with atmosphere so that atmospheric pressure will exist in the chamber of the clutch 13.

The supervisory control valves 61 and 62 are both of the same construction. They each comprise a valve body 68 having therein a shuttle-type slide valve 69 which has a downwardly projecting operating stem 70 arranged to be engaged and lifted by an elevation or cam 71 on the associated control members 31 and 32 when such control member is in neutral position. When the control members 31 and 32 are in neutral position as shown in Fig. 1 and the elevations or cams 71 thereof, acting through the stems 70, raise the slide valves 69 within the hollow valve bodies 62, both the devices 61 and 62 will be in "open" position and from the pressure piping 65', there is open communication through the supervisory valve device 61 to piping 71' which communicates with the lower end of the cylinder 55 of lock means 53, and from the piping 65 there will be open communication through the supervisory valve device 62 to piping 72 which connects to the lower portion of the cylinder 55 of the lock means 54. Therefore, if the control lever 66 of the master control M is raised when both the control members 31 and 32 are in neutral position, fluid pressure will flow from the piping 59 through the open valve 60 and through piping 65, 65', 71' and 72 to the lower ends of the cylinders 55 of the lock means 53 and 54, applying the fluid pressure to raise the pistons 56 and lift the engagers 57 from engagement with the neutral notches 58 of the control members 31 and 32.

The invention provides a speed selecting control S having pressure applying and releasing valves VR, V1, V2 and V3, connecting a pressure supply pipe 74 with the ducts DR, D1, D2 and D3, in order to supply operating fluid, such as compressed air, to the motor means represented by the cylinders 48 and 48'. The valves V have operating stems 75 which, when raised or extended, maintain the valves in exhaust position. That is to say, with exhaust pipes 76 of these valves connected to the ducts DR, D1, D2 and D3. Valve operators O, individually identified as OR, O1, O2, and O3, are provided for the valves V respectively. These valve operators O each includes a bar 77 slidably supported in a frame 78. On each of the bars 77 there is a cam face 79 for engaging a valve stem 75 when a bar 77 is moved leftwardly from the position thereof shown in Fig. 1. Each bar 77 has a projection 80 in the form of a pin, and cooperating with these projections 80, the invention provides means 81 for limiting operation of the valve operators O to one at a time, so that at no time can more than one of the valves V be opened. The limiting means 81 comprises a primary fulcrumed lever 82 swingable on a vertical axis provided by a pin 83 carried by a bracket 84 which is supported by one of the members of the frame 78. Secondary fulcrumed levers 85, individually identified as 85a and 85b, have their intermediate portions pivotally connected by pins 86 to the ends of the fulcrumed lever 82. The ends of the secondary fulcrumed levers 85 are positioned in the path of movement of the projections or pins 80 of the operators O. When one of the operators O is pressed inward (leftwardly), the projection 80 carried thereby will engage an end of a secondary fulcrumed lever 85 and will transmit a force thereto. The force thus received by an end of a fulcrumed lever 85 will be transmitted through the leverage system to apply rightward force to the projections 80 of the remaining operators O.

The action of the limiting means may be described with relation to Fig. 2, wherein the valve operator O3 has been pushed in for the purpose of actuating valve V3 so as to deliver fluid pressure through duct D3 to the rightward end of the cylinder 48', thereby selecting or preselecting actuation of the clutch C3 of the selective speed transmission. As the valve operator O3 is moved leftwardly from the out position in which it is shown in Fig. 1 toward the in position in which it is shown in Fig. 2, projection 80 of the bar portion 77 of the operator O3 will engage the end 87 of the uppermost secondary fulcrumed lever 85a and will cause counterclockwise rotation thereof, thereby bringing the lower end 88 of the lever 85a into engagement with the projection 89 of the operator O2. Then, continued counterclockwise rotation of the lever 85a will apply leftward force to the upper end of the fulcrumed lever 82, swinging the lower end thereof rightwardly, so as to carry the secondary lever 85b rightwardly into engagement with the projections 80 of the valve operators O1 and OR, to hold the operators OR, O1 and O2 rightwardly when the valve operator O3 has been pushed into the position in which it is shown in Fig. 2, the bar portion 77 being then moved into such position that the cam face 79 thereof has been carried across the stem 75 of the valve V3, thereby forcing this stem 75 downward and opening the valve V3 so that fluid pressure will flow through the duct D3.

Whether or not the pressure applied to the rightward end of the cylinder 48' as a result of the opening of the valve V3 will result in leftward movement of the control member 32 so as to engage clutch C3, will depend upon the instant condition of the lock means 54. If the control lever 66 of the master control M is in neutral or "off" position, or in lowered position, the valve 60 will be closed and no fluid pressure will be permitted to pass from the pressure supply piping 59 to the piping 65, and therefore no fluid pressure will be exerted in the cylinder 55 of the lock means 54 to raise the piston 56 and the engager 57 of the lock means 54. It will be seen, therefore, that actuation of the valve operator O3 when the lever 66 of the master control M is in "off" position or in lowered position, will merely result in presetting the speed selecting control S, so that when the lever 66 is subsequently raised so as to open the valve 60, fluid pressure will pass through the piping 65 to release the locking means 53 and 54, whereupon the pressure applied through the valve V3 to the rightward end of the cylinder 48' will act to shift the control member 32 in counterclockwise direction, this movement of the member 32 being carried through the shaft 30 and the yoke 26 to the clutch body 24, moving such clutch body 24 leftwardly and engaging clutch C3. When the lever 66 is raised into the position indicated as "neutral brake on," the opening of the valve 60 will pass fluid under pressure through the piping 65 to the brake 67, thereby stopping rotation of the shaft 10. When the control member 32 is thus moved from the position in which it is shown in Fig. 1, leftwardly to the position in which it is shown in Fig. 2, the cam 71 of the member 32 will be moved leftwardly from under the stem 70 of the supervisory control device 61. This will permit the slide valve 69 to drop into the position thereof shown in Fig. 2, thereby closing off communication of the piping 65 from the piping 71' and connecting the piping 71' to the exhaust port 90 of the device 61. This releases fluid pressure from under the piston 56 of the lock means 53 so that the engager 57 thereof will drop into engagement with the neutral notch 50 of the control member 31. Now, it will be impossible to swing the control member 31 in either direction from neutral position until the control member 32 has been returned to neutral position.

In the foregoing, we have explained how, by operation of the valve operator O3 and the raising of the control lever 66, it has been possible to effectuate leftward movement of the member 32 and engagement of clutch C3. After this has been done, the operator moves the control lever 66 downward through "off" position to lowered or "Master clutch on" position. When the lever 66 reaches neutral or "off" position, the valve 60 is operated so as to connect the piping 65 to exhaust, thereby releasing the pressure from the brake 67 and from the piping 65'. This results in release of pressure from the cylinder 55 of the lock means 54 so that the engager 57 of the lock means 54 will drop into the notch 52 of the control member 32 and lock this control member 32 in a position which maintains the clutch C3 in engagement. Thereafter, further downward movement of the lever 66 opens the valve 60a and fluid pressure is supplied from the piping 59 through piping 67 to the master clutch, thereby driving shaft 10 which in turn, through clutch C3, drives the shaft 11 at the selected speed. If it is now desired to engage either of the clutches CR or CI, it will be necessary to actuate one or the other of the valve operators OR or OI of the speed selecting control S. Referring to Fig. 2, if either of the valve operators OR or OI is pushed in, the projection 80 associated therewith will engage an end of the secondary fulcrumed lever 85b and cause the same to swing rearwardly, moving the lower end of the primary fulcrumed lever 82 leftward so that the upper end of the lever 82 will exert rightward force against the central portion of the primary fulcrumed lever 85a, which force will be applied to the projections 80 of the valve operators O2 and O3, and the valve operator O3 will be moved rightwardly from the position in which it is shown in Fig. 2 to its position of Fig. 1, thereby actuating the valve V3 so as to connect the duct D3 to atmosphere, releasing pressure from the rightward end of the cylinder 48'. Then, when the control lever 66 is raised into "Neutral brake on" position, the valve 60 will be opened and fluid pressure will be delivered through the piping 65, the supervisory control valve device 62 and the piping 72 to the lower end of the cylinder 55 of the lock means 54, to lift the engager 57 thereof out of engagement with the notch 52 of the control member 32; whereupon, the neutralizer 34a will act to return the member 32 to neutral position and thereby move the clutch body 24 into neutral position, releasing clutch C3. When the member 32 reaches neutral position, the cam 71 thereof will lift the slide valve element 69 of the supervisory control valve device 61, connecting piping 65' and 71' so that fluid pressure will flow into the lower end of the cylinder 55 of the lock means 53, lifting the engager 57 thereof out of the neutral notch 50 of the control member 31. This release of the lock means 53 frees the control member 31 so that fluid pressure in the cylinder 48 may move it laterally in a direction, depending upon which of the valve operators OR, OI, has been pushed in, as previously described, to cause engagement of either the clutch CR or CI. The association of control mechanisms described in the foregoing prevents actuation of clutches while the power shaft 10 is being driven or is spinning, and the supervisory valve mechanism comprising elements 61 and 62, in conjunction with the limiting means 81 of the speed selecting control S, prevents engagement of more than one clutch at a time; hence, it is impossible to engage two of the clutches at the same time. In the use of the invention, which has been diagrammatically illustrated, the controls M and S may be disposed at any desired distance from the transmission. Where the invention is used in a well drilling drawworks, the controls M and S are placed in the driller's position at the front of the drawworks and the control members 31 and 32 with their associated parts are located at the rear of the drawworks, the piping and duct members being extended as required from the valves of the controls M and S to the fluid motors and valve devices associated with the controls at the back of the drawwork.

We claim as our invention:

1. In a mechanism for controlling a multi-speed transmission having a brake, the combination of: a plurality of control members, each adapted to be moved between a first position and a second position, one of said positions being off position and the other of said positions being on position; means to move said control members to said first positions from said second positions; a fluid motor for each of said control members operative to move the same into said second positions thereof; selective means operative to supply operating fluid respectively to said motors; releasable lock means for each of said control members operating to prevent movement thereof; brake operating means for the brake of the transmission movable between "on" and "off" positions; means coordinated with said brake operating means to release said lock means when said brake operating means is in "on" position; and control means adapted to automatically supervise the operation of said lock means, said control means being characterized by comprising parts arranged so as to act in response to movement of one of said control members from said first to second position thereof to prevent release of the lock means associated with the other of said control members.

2. In a mechanism for controlling a multi-speed transmission having a brake, the combination of: a plurality of control members, each adapted to be moved between a first position and a second position, one of said positions being off position and the other of said positions being on position; a fluid motor for each of said control members operative to move the same into said second positions thereof; selective means operative to supply operating fluid respectively to said motors; releasable lock means for each of said control members operating to prevent movement thereof; brake operating means for the brake of the transmission movable between "on" and "off" positions; means coordinated with said brake operating means to release said lock means when said brake operating means is in "on" position; control means adapted to automatically supervise the operation of said lock means, said control means being characterized by comprising parts arranged so as to act in response to movement of one of said control members from first to second position thereof to prevent release of the lock means associated with the other of said control member; and limiting means associated with said selective means operating to limit supply of operating fluid to one of said motors at a time.

3. In a mechanism for controlling a multi-speed transmission having a brake, rotatable parts and clutch means for connecting said rotatable parts to drivable parts, the combination of: a plurality of control members adapted to move said clutch means between "on" and "off" positions, each adapted to be moved between a first position and a second position, one of said positions being off position and the other of said positions being on position; means to move said control members to said first positions from said second positions; a fluid pressure differential motor for each of said control members operative to move the same into said second positions thereof; selective means operative to supply operating fluid pressure differential respectively to said motors; normally engaged releasable lock means for each of said control members operating to prevent movement thereof; brake operating means for the brake of the transmission movable between "on" and "off" positions; means coordinated with said brake operating means to release said lock means when said brake operating means is in "on" position; and control means adapted to automatically supervise the operation of said lock means, said control means being characterized by comprising parts arranged so as to act in response to movement of one of said control members from said first to "on" position thereof to prevent release of the lock means associated with the other of said control members.

4. In a mechanism for controlling a multi-speed transmission, the combination of: a plurality of control members, each adapted to be moved between a first position and a second position, one of said positions being off position and the other of said positions being on position; means to move said control members to said first positions from said second positions; fluid motor means operative to move said control members into said second positions thereof, said motor means comprising four chambers in which fluid pressure differential acts; selective means operative to supply operating fluid pressure differential respectively to said motors, comprising four fluid control valves to connect said fluid motors to an operating fluid pressure differential supply, four valve operators respectively movable from "out" to "in" positions to open said valves; means acting when one of said operators moves to "in" position to hold the remaining of said operators in "out" position, said last named means comprising a primary fulcrumed lever supported so as to swing on a point intermediate its ends and a pair of secondary fulcrumed levers, each having the intermediate portion thereof pivotally connected to an end of said primary fulcrumed lever and positioned so that the four ends thereof will respectively engage said operators in such manner that movement of an end of one of said secondary fulcrumed levers by inward force received from one of said operators when it is moved toward "in" position will produce outward force against the remaining of said operators to hold the same in "out" position; normally engaged releasable lock means for each of said control members operating to prevent movement thereof; means operative to release said lock means; and control means adapted to automatically supervise the operation of said lock means, said control means being characterized by comprising parts arranged so as to act in response to movement of one of said control members from first to second position thereof to maintain the lock means associated with the other of said control members in locked condition.

5. In a mechanism for controlling a multi-speed transmission having a brake, rotatable parts and clutch means for connecting said rotatable parts to drivable parts, the combination of: a plurality of control members adapted to move said clutch means between "on" and "off" positions, each adapted to be moved between a first position and a second position, one of said positions being off position and the other of said positions being on position; means to move said control means to said first positions from said second positions; fluid motor means operative to move the same into said second positions thereof, said motor means comprising four chambers in which fluid pressure differential acts; selective means operative to supply operating fluid pressure differential respectively to said motors, comprising four fluid control valves to connect said fluid motors to an operating fluid pressure differential supply, four valve operators respectively movable from "out" to "in" positions to open said valves; means acting when one of said operators moves to "in" position to hold the remaining of said operators in "out" position, said last named means comprising a primary fulcrumed lever supported as to swing on a point intermediate its ends and a pair of secondary fulcrumed levers, each having the intermediate portion thereof pivotally connected to an end of said primary fulcrumed lever and positioned so that the four ends thereof will respectively engage said operators in such manner that movement of an end of one of said secondary fulcrumed levers by inward force received from one of said operators when it is moved toward "in" position will produce outward force against the remaining of said operators to hold the same in "out" position; releasable lock means for each of said control members operating to prevent movement thereof; brake operating means for the brake of the transmission movable between "on" and "off" positions; means coordinated with said brake operating means to release said lock means when said brake operating means is in "on" position; and control means adapted to automatically supervise the operation of said lock means, said control means being characterized by comprising parts arranged so as to act in response to movement of one of said control members from said first to "on" position thereof to maintain the lock means associated with the other of said control members in locked condition.

6. In a mechanism for controlling a multi-speed transmission having a brake, the combination of: a plurality of control members, each adapted to be moved between a first position and a second position, one of said positions being off position and the other of said positions being on position; means to move said control members to said first positions from said second positions; fluid pressure differential motors for said control members operative to move the same into said second positions thereof; selective means operative to supply operating fluid pressure differential respectively to said motors; normally engaged lock means preventing movement of said control members from said first to said second positions thereof; releasing means operative by fluid pressure differential to release said lock means; brake operating means for the brake of the transmission movable between "on" and "off" positions; control means coordinated with said brake operating means operating to deliver fluid pressure differential to said releasing means when said brake operating means is in "on" position so as to release said lock means, said control means including ducts leading to said releasing means; valves in said ducts operative to prevent flow of pressure differential to said releasing means; and means adapted to act in response to movement of one of said control members into second position thereof to actuate the valve which is operative to prevent flow of pressure differential to the releasing means which is operative to release the lock means of the other of said control members, thereby preventing movement of the other of said control members into said second position thereof.

7. In a mechanism for controlling a multi-speed transmission, the combination of: a plurality of control members, each adapted to be moved between a first position and a second position, one of said positions being off position and the other of said positions being on position; means to move said control members to said first positions from said second positions; a fluid motor for each of said control members operative to move the same into said second positions thereof; selective means operative to supply operating fluid respectively to said motors; normally engaged releasable lock means for each of said control members operating to prevent movement thereof; releasing means operative to apply a force to release said lock means; and control means operating between said releasing means and said lock means, each of said control means comprising a part movable between first and second position in consequence of the movement of one of said control members between first and second positions thereof, and means connected to and operating in consequence of the movement of said part into first position thereof to effect release by said force of the lock means associated with the other of said control members.

8. In a mechanism for controlling a multi-speed transmission, the combination of: a plurality of control members, each adapted to be moved between a first position and a second position, one of said positions being off position and the other of said positions being on position; a fluid motor for each of said control members operative to move the same into said second positions thereof; selective means operative to supply operating fluid respectively to said motors; normally engaged releasable lock means for each of said control members operating to prevent movement thereof; releasing means operative to apply a force to release said lock means; control means operating between said releasing means and said lock means, each of said control means comprising a part connected to one of said control members so as to be moved between first and second positions in accordance with the movement of said one of said control members between first and second positions thereof, and means connected to and operating in consequence of the movement of said part into the first position thereof to effect release by said force of the locking means associated with the other of said control members; and limiting means associated with said selective means operating to limit supply of operating fluid to one of said motors at a time.

9. In a mechanism for controlling a multi-speed transmission, the combination of: a plurality of control members, each adapted to be moved between a first position and a second position, one of said positions being off position and the other of said positions being on position; a fluid motor for each of said control members operative to move the same into said second positions thereof; selective means operative to supply operating fluid respectively to said motors; normally engaged releasable lock means for each of said control members operating to prevent movement thereof; releasing means operative to apply a force to release said lock means; and control means operating between said releasing means and said lock means, each of said control means comprising a part connected to one of said control members so as to be moved between first and second positions in accordance with the movement of said one of said control members between first and second positions thereof, and means connected to and operating in consequence of the movement of said part into the first position thereof to effect release by said force of the locking means associated with the other of said control members.

10. In a mechanism for controlling a multi-speed transmission having rotatable parts and clutch means for connecting said rotatable parts to drivable parts, the combination of: a plurality of control members adapted to move said clutch means between "on" and "off" positions, each adapted to be moved between a first position and a second position, one of said positions being off position and the other of said positions being on position; a fluid pressure differential motor for each of said control members operative to move the same into said second positions thereof; selective means operative to supply operating fluid pressure differential respectively to said motors; normally engaged releasable lock means for each of said control members operating to prevent movement thereof; means operative to release said lock means; control means operating between said releasing means and said lock means, each of said control means comprising a part connected to one of said control members so as to be moved between first and second positions in accordance with the movement of said one of said control members between first and second positions thereof, and means connected to and operating in consequence of the movement of said part into the first position thereof to effect release by said force of the locking means associated with the other of said control members; and limiting means associated with said selective means operating to limit supply of operating fluid to one of said motors at a time.

ALBERT A. ASHTON.
JACK A. AMERMAN.

REFERENCES CITED

The following references are of record in the file of this patent:

UNITED STATES PATENTS

| Number | Name | Date |
|---|---|---|
| Re. 19,928 | Linsley | Apr. 14, 1936 |
| 1,360,035 | Shepherd | Nov. 23, 1920 |
| 1,458,421 | Kesling | June 12, 1923 |
| 1,529,369 | Nash | Mar. 10, 1925 |
| 1,673,487 | Bice | June 12, 1928 |
| 1,820,269 | Craig | Aug. 25, 1931 |
| 2,086,723 | Maybach | July 13, 1937 |
| 2,130,618 | Gnavi | Sept. 20, 1938 |
| 2,167,790 | Whitehead | Aug. 1, 1939 |
| 2,180,154 | Lenz | Nov. 14, 1939 |
| 2,226,660 | Eaton | Dec. 31, 1940 |
| 2,464,986 | Miller | Mar. 22, 1949 |

FOREIGN PATENTS

| Number | Country | Date |
|---|---|---|
| 670,844 | Germany | Jan. 27, 1939 |